United States Patent [19]

Baldi et al.

[11] 4,014,125
[45] Mar. 29, 1977

[54] RESILIENT BAND-POWERED FISH AND ANIMAL SPEAR

[76] Inventors: Daniel G. Baldi, 36 Crestfield Drive, Brockton, Mass. 02402; James A. Baldi, 120 Sumner St., Newton Centre, Mass. 02159

[22] Filed: July 31, 1975

[21] Appl. No.: 600,883

[52] U.S. Cl. .................................... 43/6; 124/22
[51] Int. Cl.² .................................... A01K 81/04
[58] Field of Search ............... 43/6, 19, 42, 35; 124/22

[56] References Cited
UNITED STATES PATENTS

| 368,588 | 8/1887 | Horton | 124/22 |
|---|---|---|---|
| 2,537,754 | 1/1951 | Hanshaw | 43/6 |
| 2,700,842 | 2/1955 | Lehmann | 43/35 |
| 2,869,273 | 1/1959 | Thorburn | 43/6 |

Primary Examiner—Warner H. Camp

[57] ABSTRACT

The invention is a device for spearing fish and animals. It has a handgrip with a bore running lengthwise through it. Slidably mounted in the bore is a spear shaft propelled by a resilient band affixed to its end and to the handgrip. When a groove around the front portion of the spear shaft is moved back into the handgrip, a blade which moves inwardly in a slot extending from the outside of the handgrip through the wall of the bore snaps into the groove, locking the spear shaft in a state of readiness. The spear is fired by depressing a trigger which is attached to the locking blade and which moves the blade out of the groove.

1 Claim, 4 Drawing Figures

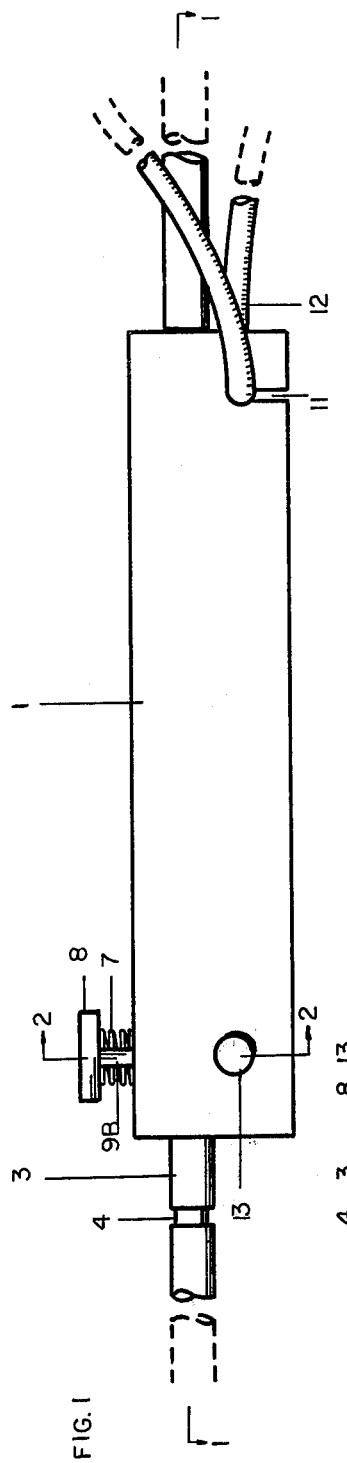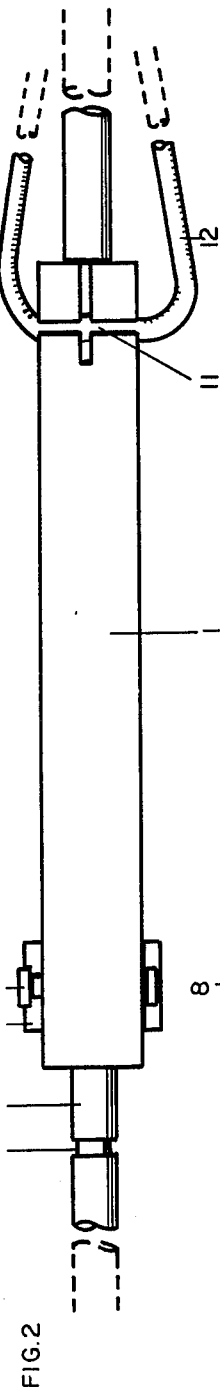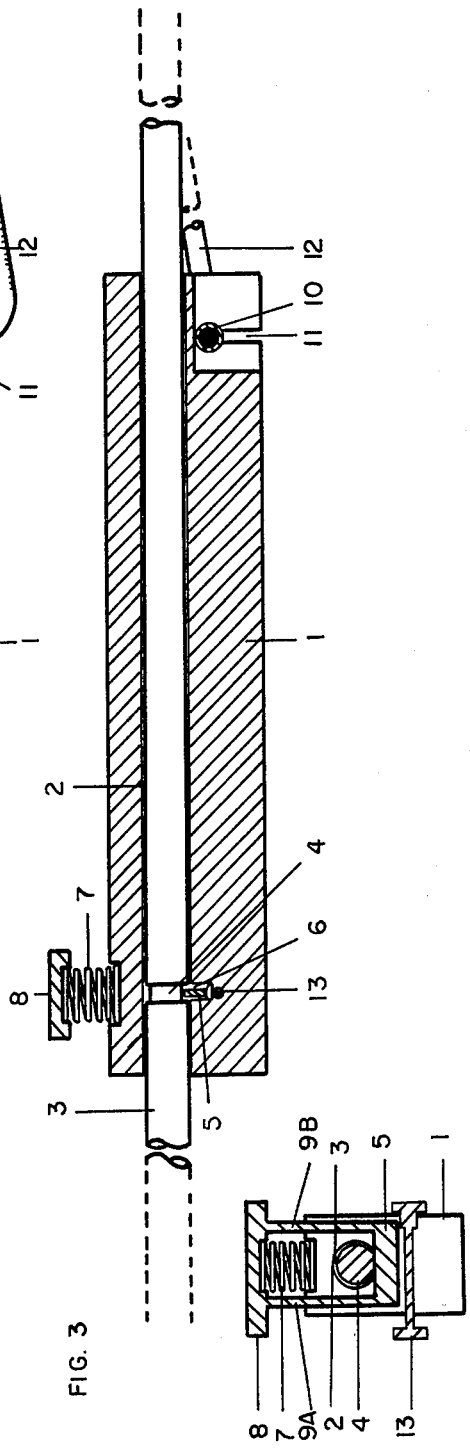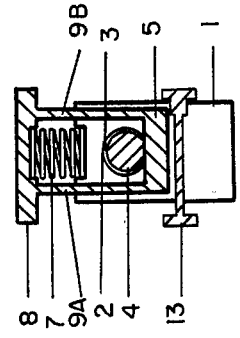

RESILIENT BAND-POWERED FISH AND ANIMAL SPEAR

BACKGROUND OF THE INVENTION

The invention relates to hand-held spearing devices powered by resilient bands and designed for the spearing of fish and animals when in water, on the surface of water, or on land.

PRIOR ART

There have been many varying forms of spearing devices patented. One common type is shown in the patent to Chappell U.S. Pat. No. 3,456,376, which uses a spring-actuated plunger telescopingly mounted inside another tube with a slot which is needed for alignment, said plunger being held by an externally mounted handle. In another version of Chappell's invention, an elastic band is used; the telescoping design and the slot are still integral parts. In the patent to Hanshaw U.S. Pat. No. 2,537,754, a spring-projected spear with a rear-mounted crosshead is slidably moved in a tubular handle which has bearings set in it for alignment purposes; also, a square-shaped locking sleeve with a hole set vertically in the top must line up with the triggering and locking mechanism. In the two cases cited, springs are used to produce action; and precise alignment is needed for the devices to work.

SUMMARY

As can be seen from the drawings, the invention consists of a handgrip which has a bore running lengthwise through it and in which is slidably mounted a spear shaft with a groove around it. Fastened to the rearward end of the spear shaft is a resilient band which furnishes the power for propelling the spear shaft forward. Through the handgrip from one side to the other is a hole with a slot in its wall. The hole, which is located near the end of the handgrip, is provided for anchoring the resilient band. Going across and through the wall of the bore and extending to the outside of the handgrip is a slot through which a locking blade can move outwardly or inwardly. The locking blade is attached to a trigger button on the opposite side of the handgrip by two side members. A compression spring under the trigger button keeps the locking blade tensioned against the spear shaft so that, as the spear shaft is drawn back into the handgrip, the locking blade snaps into the groove around the spear shaft, locking the spear so that it cannot move. To propel the spear shaft forward, the user depresses the trigger button to force the locking blade out of the groove so that the spear is thrust forward under the power of the contracting resilient band. As can be easily seen, the spearing device affords the user an implement which is simple in construction, light, well-balanced, and easy to use. No precise alignment is needed when loading the spear shaft; the locking blade becomes engaged even if the spear shaft is rotated.

DESCRIPTION OF THE DRAWINGS

FIG. 1 is an external view of the invention in its unloaded position.

FIG. 2 is a bottom view of the invention in its unloaded position.

FIG. 3 is a cross section on a plane 1-1 of FIG. 1 and showing the invention when in a state of readiness.

FIG. 4 is a cross sectional view on a plane 2-2 of FIG. 1 and showing the invention with the safety in the on position when in the state of readiness.

DESCRIPTION OF THE SPECIFICATIONS

The handgrip 1 has running lengthwise through it a bore 2. A spear shaft 3 with a groove 4 around it near the forward end is slidably mounted in the bore 2. The spear shaft 3 has attached to its rearward end a resilient band 12 which stretches as the spear shaft 3 is moved back into the bore 2 and is locked in a state of readiness. As the spear shaft 3 is moved back into the bore 2, a compression spring 7 under the trigger button 8 causes the locking blade 5 that is attached to the trigger button 8 by side members 9A and 9B to be pulled inward in the blade slot 6 so that the locking blade 5 comes to rest in the groove 4 in the spear shaft 3, locking the spear shaft 3 so that it cannot move. The stretched resilient band 12 is attached in the hole 10 in the handgrip 1 and to the end of the spear shaft 3. To shoot the spear shaft 3, the trigger button 8 must be depressed so that the locking blade 5 attached to the trigger button 8 by side members 9A and 9B moves outward in the blade slot 6 away from the spear shaft 3 and out of the groove 4, allowing the spear shaft 3 to move forward freely under the influence of the contracting resilient band 12. The hole 10 running crosswise through the handgrip 1 has a slot 11 so that the resilient band 12 can be easily inserted or removed. A safety 13, which is a slidable bar, is pushed in under the locking blade 5 from the side to prevent the locking blade 5 from moving out of the groove 4.

While we have shown our invention in but one form, it is obvious to those skilled in the art that a rod or a bar can be substituted for the locking blade. It is to be understood, therefore, that, although it is not specifically stated in the following claims, this item can be a blade, a rod, or a bar.

What we claim is as follows:

1. A device for spearing fish or animals that is easily manipulated with one hand in water, on the surface of water, or on land, said spearing device comprising, in combination, (1) a handgrip having a bore running lengthwise through it; (2) a spear shaft having a groove around it, slidably mounted in the bore running lengthwise through the handgrip; (3) a locking blade which moves up and down, entering and exiting the bore in the handgrip through a slot in the lower wall of said bore; (4) a trigger button attached to the locking blade by vertically moving side members; (5) a coil spring mounted under the trigger button; (6) a hole transversing the handgrip under the bore; (7) a resilient band formed into a loop attached to the spear shaft by any one of many existing ways, the resilient band being stretched and narrowed so as to snap into the hole transversing the handgrip under the bore so that, as the spear shaft is moved backward in the bore running lengthwise through the handgrip, the resilient band is stretched tight until the groove around the spear shaft passes over the locking blade which is pulled upward as the coil spring expands under the trigger button attached to the locking blade by vertically moving side members, causing the locking blade to lock and preventing the spear shaft from being fired until the trigger button is depressed, forcing the locking blade out of the groove around the spear shaft so that, as the resilient band contracts, the spear shaft is thrust forward.

* * * * *